United States Patent

[11] 3,634,727

| [72] | Inventor | William Ronald Polye |
| | | River Edge, N.J. |
| [21] | Appl. No. | 780,666 |
| [22] | Filed | Dec. 3, 1968 |
| [45] | Patented | Jan. 11, 1972 |
| [73] | Assignee | The Bendix Corporation |

[54] CAPACITANCE-TYPE PRESSURE TRANSDUCER
12 Claims, 3 Drawing Figs.

[52] U.S. Cl.................................................. 317/231,
  317/235, 317/234
[51] Int. Cl..................................................... H01g 9/16
[50] Field of Search............................................ 317/234,
  235, 231

[56] References Cited
UNITED STATES PATENTS

| 3,088,323 | 5/1963 | Welkowitz et al. | 317/235 X |
| 3,199,340 | 8/1965 | Hartenstein et al. | 317/235 X |
| 3,328,649 | 6/1967 | Rindner et al. | 317/234 |
| 3,392,576 | 7/1968 | Hollander | 317/235 X |
| 3,411,361 | 11/1968 | McLellan | 317/235 X |
| 3,440,873 | 4/1969 | Eickelberger | 317/235 X |
| 3,445,596 | 5/1969 | Drake et al. | 317/235 X |

Primary Examiner—James D. Kallam
Attorney—Plante, Hartz, Smith and Thompson

ABSTRACT: A pressure sensor of the capacitance-type comprising a hollow capsule formed of a pair of discs of single crystal silicon doped to make it electrically conductive and having a layer of silicon dioxide on the surfaces of the discs with portions of the silicon dioxide layer and discs being cut away on opposing faces of the discs to form a cavity therebetween. The discs are insulated from one another and form the plates of a condenser which changes capacity when the sensor is subjected to pressure changes.

INVENTOR.
WILLIAM R. POLYE
BY
ATTORNEY

CAPACITANCE-TYPE PRESSURE TRANSDUCER

BACKGROUND OF THE INVENTION

The invention relates to pressure sensors and more particularly to pressure sensors of the capacitance type.

Pressure sensors as used heretofor used diaphragms made of iron, copper or nickel alloys for sensing changes in pressure. The pressure sensors were not as accurate as required because of hysteresis and variations in spring rates. Also the pressure sensors had the disadvantages of relatively large size and questionable reliability.

SUMMARY OF THE INVENTION

One object of the present invention is to provide a pressure sensor which is relatively small without sacrificing stability and sensitivity.

Another object of the invention is to provide a pressure sensor especially adapted for airborne use.

Another object of the invention is to provide a pressure sensor which has negligible hysteresis characteristics.

Another object of the invention is to provide a pressure sensor made of single crystal silicon.

Another object of the invention is to provide a pressure sensor of the capacitance type in which the silicon is doped to make it electrically conductive so that the walls of the pressure sensor form the plates of a condenser which changes capacity in accordance with changes in pressure.

Another object of the invention is to provide a novel method of making a pressure sensor of the kind described.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

DESCRIPTION OF THE INVENTION

Figure 1:
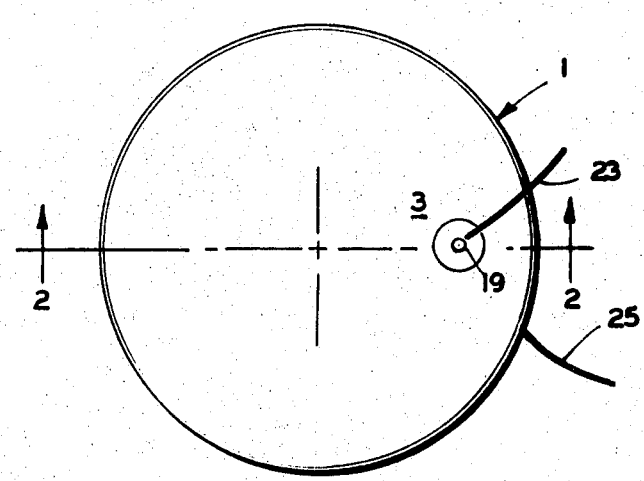
FIG. 1 shows a top view of a pressure sensor constructed according to the invention.

Shown in the drawing are two embodiments of a novel pressure sensor of the capacitance type constructed according to the invention.

Figure 2:
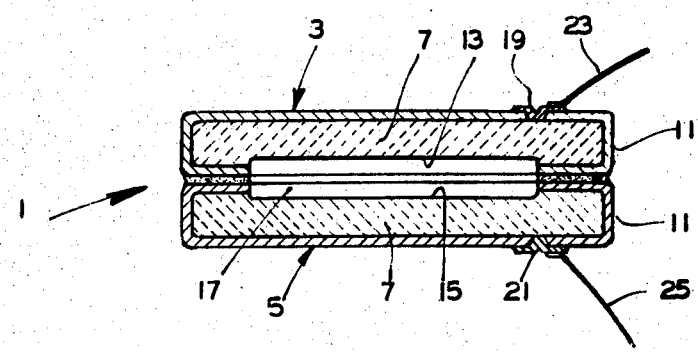
FIG. 2 is a vertical section taken on the line 2—2 of FIG. 1.
Figure 3:
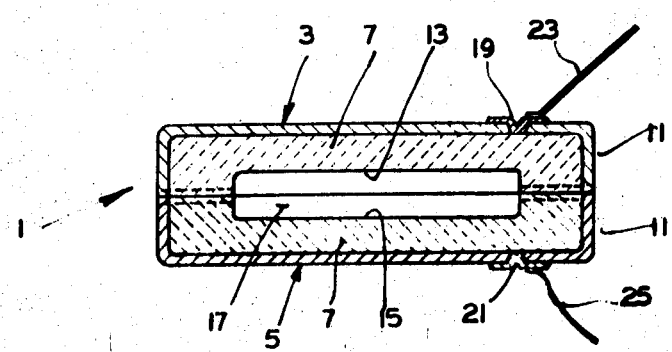
FIG. 3 is a vertical section similar to FIG. 2 showing another embodiment of the invention.

The pressure sensor shown in FIGS. 1, 2 and 3 comprises a hollow capsule 1 having opposing walls 3, 5 formed of two discs of silicon 7. The discs preferably are cut from a large single crystal of pure silicon which has been doped (either $n$ or $p$ type) to make it reasonably conductive preferably in the range of a few ohm-centimeters resistivity. The silicon is polished smoothly on both sides by well-known techniques and then oxidized so that a silicon dioxide layer 11, preferably 0.2 to 0.5 microns in thickness is formed over all surfaces.

The central regions 13, 15 of opposing sides of discs are etched by a photoresist etching process to a predetermined depth. The etching removes the oxide layer and a portion of the silicon in the central region to provide a cavity 17 between the discs after assembly. Holes 19, 21 are etched through the oxide on the outer sides of discs 3, 5 and ohmic contacts are deposited in an around the holes and wires 23, 25 are attached thereto for electrical connection in a circuit. The discs form the plates of a condenser and flex when the pressure to which the pressure sensor is exposed changes so that the capacity of the condenser changes in accordance with change in pressure. The capsule may be evacuated or filled with any suitable gas at any desired pressure. The pressures inside and outside the capsule may both vary so that the condenser then provides an output corresponding to differential pressure.

The discs may be joined together as shown in FIG. 2 by metallizing the oxide at the interface by well-known methods, such as evaporation or sputtering, and completing the seal using familiar brazing techniques. The discs also may be joined together by a nonmetallic hermetic joint using low melting temperature glasses which are compatible with silicon, such as Pyroceram, sold by Corning Glass Company. Such a low-melting temperature glass may have the following composition: 68 percent Silicon Dioxide, 20 percent Lead Oxide, 5 percent Sodium Oxide, 6 percent Potassium Oxide, 1 percent Calcium Oxide.

A preferred arrangement is shown in FIG. 3 wherein the silicon dioxide is removed from the mating surfaces of the discs by a photoresist etching process and the silicon is converted to the opposite conductivity ($p$ or $n$ type) from that of the bodies of the discs. The discs then may be joined together by a metallic bond, such as silicon-gold eutectic commonly employed in the semiconductor industry.

Irrespective of how the discs are joined together, the joint must be constructed so as not to disturb the elastic properties of the discs nor introduce hysterises effects into the operation of the sensor. The joint must provide electrical insulation between the two discs since they are the conducting elements of the capacitor. The insulation normally is provided by the silicon dioxide layer or by the opposite conductivity-type present on the mating surfaces of the discs.

The novel method of making the pressure sensors shown in FIGS. 1 to 3 comprises the following steps:

1. A large single crystal of pure silicon is doped (either $n$ or $p$ type) to make it reasonably conductive in the range of a few ohm centimeters resistivity.

2. A pair of discs are cut from the crystal.

3. The discs are polished smoothly on both sides and are then oxidized to form a silicon dioxide layer on all surfaces to a thickness between 0.2 to 0/5 microns.

4. The central region of one side of each disc is removed to a predetermined depth by precision photoresist etching methods.

5. Holes are etched through the oxide on the sides of the discs opposite the etched central regions.

6. Ohmic contacts are deposited in the holes.

7. Electrical connectors are attached to the ohmic contacts.

8. The discs are joined together in the embodiment of FIGS. 1 and 2 by metallizing the oxide on the mating surfaces of the discs by evaporating or sputtering and then brazing or by using low melting temperature glasses compatible with silicon as described above, such as Pyroceram sold by Corning Glass Company.

In the embodiment of FIG. 3 the silicon dioxide is removed from the mating surfaces of the discs by a photoresist process and the silicon in these regions is converted to the opposite conductivity ($p$ or $n$ type) from that of the body of the discs. The discs are joined together by a metallic bond, such as a silicon-gold eutectic.

The discs must be insulated from one another either by the silicon dioxide layer or by the opposite conductivity-type material or by the material joining the discs together.

A pressure sensor constructed according to the invention is relatively small in size (about 1-inch diameter) and is extremely stable and sensitive and is especially adapted for airborne use. The pressure sensor has negligible hysteresis characteristics.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A pressure sensor comprising a hollow capsule having spaced opposing walls formed of single crystal silicon insulated from one another, said walls being movable relative to one another in response to changes in pressure for changing the capacitance therebetween.

2. A pressure sensor as described in claim 1 in which opposing faces of the walls are recessed to form a cavity therebetween.

3. A pressure sensor as described in claim 1 which is of the capacitance type and the walls form the plates of a capacitor.

4. A pressure sensor as described in claim 3 having means for connecting the capacitor plates electrically in a circuit.

5. A pressure sensor as described in claim 3 in which the silicon is doped to make it conductive.

6. A pressure sensor as described in claim 5 in which the walls are insulated from one another by a layer of silicon dioxide.

7. A pressure sensor as described in claim 5 in which the walls are insulated from one another by converting mating surfaces of the silicon to a conductivity-type opposite from that of the silicon.

8. A pressure sensor comprising a pair of discs formed of single crystal silicon doped to make it conductive, means for joining the discs together at their peripheries so that the discs are insulated from one another and form a cavity therebetween, and the discs forming the plates of a condenser which changes capacity upon being subjected to changes in pressure.

9. A pressure sensor as described in claim 8 in which a layer of silicon dioxide is provided on mating surfaces of the discs to insulate the discs from one another.

10. A pressure sensor as described in claim 8 in which the silicon is converted to opposite conductivity-type at a mating surface of at least one of the discs to insulate the discs from one another.

11. A pressure sensor as described in claim 8 having means for connecting the condenser plates in a circuit.

12. A pressure sensor as described in claim 8 in which the discs have recessed portions which form the cavity.

* * * * *